(12) United States Patent
Patrick et al.

(10) Patent No.: US 10,902,115 B2
(45) Date of Patent: Jan. 26, 2021

(54) NEUROMORPHIC SYSTEM FOR AUTHORIZED USER DETECTION

(71) Applicant: HRL Laboratories, LLC, Malibu, CA (US)

(72) Inventors: Richard J. Patrick, Irvine, CA (US); Nigel D. Stepp, Santa Monica, CA (US); Vincent De Sapio, Westlake Village, CA (US); Jose Cruz-Albrecht, Oak Park, CA (US); John Richard Haley, Jr., Chantilly, VA (US); Thomas M. Trostel, Reston, VA (US)

(73) Assignees: HRL Laboratories, LLC, Malibu, CA (US); The Boeing Company, Chicago, IL (US)

( * ) Notice: Subject to any disclaimer, the term of this patent is extended or adjusted under 35 U.S.C. 154(b) by 56 days.

(21) Appl. No.: 16/380,687

(22) Filed: Apr. 10, 2019

(65) Prior Publication Data

US 2019/0303568 A1 Oct. 3, 2019

Related U.S. Application Data

(63) Continuation-in-part of application No. 15/338,228, filed on Oct. 28, 2016, now abandoned.
(Continued)

(51) Int. Cl.
 *G06F 21/55* (2013.01)
 *G06N 3/08* (2006.01)

(52) U.S. Cl.
 CPC .......... *G06F 21/552* (2013.01); *G06F 21/554* (2013.01); *G06N 3/08* (2013.01); *G06F 2221/034* (2013.01)

(58) Field of Classification Search
 None
 See application file for complete search history.

(56) References Cited

U.S. PATENT DOCUMENTS

| 7,487,089 B2 | 2/2009 | Mozer |
| 8,977,578 B1 | 3/2015 | Cruz-Albrecht et al. |

(Continued)

FOREIGN PATENT DOCUMENTS

JP  2013-546065 A  12/2013

OTHER PUBLICATIONS

Notification of Transmittal of International Search Report and the Written Opinion of the International Searching Authority for PCT/US2019/026830; dated Aug. 5, 2019.
(Continued)

*Primary Examiner* — Daniel T Pellett
(74) *Attorney, Agent, or Firm* — Tope-McKay & Associates

(57) ABSTRACT

Described is neuromorphic system for authorized user detection. The system includes a client device comprising a plurality of sensor types providing streaming sensor data and one or more processors. The one or more processors include an input processing component and an output processing component. A neuromorphic electronic component is embedded in or on the client device for continuously monitoring the streaming sensor data and generating out-spikes based on the streaming sensor data. Further, the output processing component classifies the streaming sensor data based on the out-spikes to detect an anomalous signal and classify the anomalous signal.

13 Claims, 10 Drawing Sheets

Related U.S. Application Data

(60) Provisional application No. 62/247,557, filed on Oct. 28, 2015, provisional application No. 62/684,515, filed on Jun. 13, 2018.

(56) References Cited

U.S. PATENT DOCUMENTS

| | | | |
|---|---|---|---|
| 2014/0075493 | A1 | 3/2014 | Krishnan |
| 2015/0106310 | A1 | 4/2015 | Birdwell et al. |
| 2015/0163121 | A1 | 6/2015 | Mahaffey |
| 2016/0048670 | A1* | 2/2016 | Kim ................ G06K 9/0008 382/117 |
| 2017/0024877 | A1 | 1/2017 | Versace |
| 2017/0154218 | A1* | 6/2017 | Kisters ................ B42D 25/305 |
| 2017/0163638 | A1* | 6/2017 | Kisters ................ G06K 19/041 |
| 2017/0229117 | A1 | 8/2017 | van der Made et al. |

OTHER PUBLICATIONS

International Search Report of the International Searching Authority for PCT/US2019/026830; dated Aug. 5, 2019.
Written Opinion of the International Searching Authority for PCT/US2019/026830; dated Aug. 5, 2019.
Stephan M. Salas et al., 'Neuromorphic and Early Warning Behavior-Based Authentication in Common Theft Scenarios', Published in: 2017 IEEE International Symposium on Technologies for Homeland Security (HST), Jun. 8, 2017.
Guo-Xun Yuan; Chia-Hua Ho; Chih-Jen Lin (2012). "Recent Advances of Large-Scale Linear Classification". Proc. IEEE. 100 (9), pp. 2584-2603.
Maass, Wolfgang; Natschläger, Thomas; Markram, Henry (Nov. 2002), "Real-time computing without stable states: a new framework for neural computation based on perturbations" (PDF), Neural Comput, 14 (11): pp. 2531-2560.
Cruz-Albrecht, Jose M., Timothy Derosier, and Narayan Srinivasa. "A scalable neural chip with synaptic electronics using CMOS integrated memristors." Nanotechnology 24, No. 38 (2013): 384011, pp. 1-11.
Cruz-Albrecht, J., Derosier, T., and Srinivasa, N. "Scalable neural chip with synaptic electronics using CMOS integrated memristors." Nanotechnology, vol. 24, p. 384011 (11pp), Special Issue on Synaptic Electronics, 2013.
Draffin, B., J. Zhu, and J. Zhang. "KeySens: Passive User Authentication through Micro-behavior Modeling of Soft Keyboard Interaction." In Proceedings of the 5th International Conference on Mobile Computinng (MobiCASE) Applications and Services, 2013, pp. 184-201.
Feng, T., J. Yang, Z. Yan, E.M. Tapia, and W. Shi. "TIPS: Context-Aware Implicit User Identification using Touch Screen in Uncontrolled Environments." In Proceedings of the 15th International Workshop on Mobile Computing Systems and Applications (HotMobile), 2014, pp. 1-6.
Gupta, A., M. Miettinen, and N. Asokan. "Intuitive Security Policy Configuration in Mobile Devices using Context Profiling." In Proceedings of the International Confernece on Social Computing (SocialCom), 2012, pp. 471-480.
Hayashi, E., S. Das, S. Amini, J. Hong, and I. Oakley. "CASA: Context-Aware Scalable Authentication." Proceedings of the Symposium on Usable Privacy and Security (SOUPS), 2013, pp. 1-10.
Jakobsson, M., E. Shi, P. Golle, and R. Chow. "Implicit Authentication for Mobile Devices." In Proceedings of the 4th USENIX Workshop on Hot Topics in Security (HotSec). 2009, pp. 1-6.
Karsai, M., Kaski, K., Barabási, A. L, and Kertész, J. "Universal features of correlated bursty behaviour." Scientific Reports, vol. 2, 2012, pp. 1-7.
Lin, C-C., D. Liang, C-C. Chang, and C-H. Yang. "A New Non-Intrusive Authentication Method based on the Orientation Sensor for Smartphone Users." In Proceedings of 6th International Conference on Software Security & Reliability, 2012, pp. 245-252.

Moon, H., and Lu, T. C. "Network Catastrophe: Self-Organized Patterns Reveal both the Instability and the Structure of Complex Networks." Scientific reports, 5, 2015, pp. 1-10.
Ni, K-Y. and Lu, T-C."Information Dynamic Spectrum Characterizes System Instability toward Critical Transitions." EPJ Data Science, vol. 3, No. 1, pp. 1-25, 2014.
O'Brien, M. J., and Srinivasa, M. J. "A Spiking Neural Model for Stable Reinforcement of Synapses Based on Multiple Distal Rewards." Neural Computation, vol. 25, No. 1, pp. 123-156, 2013.
Riva, O., C. Qin, K. Strauss, and D. Lymberopoulos. "Progressive Authentication: Deciding When to Authenticate on Mobile Phones." In Proceedings of the 21st USENIX Security Symposium, 2012, pp. 1-16.
Shi, E., Y. Niu, M. Jakobsson, and R. Chow. "Implicit Authentication through Learning User Behavior." In Proceedings of the 13th international conference on Information security, 2010, pp. 99-113.
Shi, W., J. Yang, Y. Jiang, F. Yang, and Y. Xiong. "SenGuard: Passive User Identification on Smartphones Using Multiple Sensors." In Proceedings of the 7th IEEE International Conference on Wireless and Mobile Computing, Networking and Communications, 2011, pp. 141-148.
Srinivasa, N., and Cho, Y. K. "Unsupervised Discrimination of Patterns in Spiking Neural Networks with Excitatory and Inhibitory Synaptic Plasticity." Frontiers in Computational Neuroscience, vol. 8, 2014, pp. 1-23.
Srinivasa, N., and Cho, Y. K. "A Self-Organizing Spiking Neural Model for Learning Fault-Tolerant Spatio-Motor Transformations." IEEE Transactions on Neural Networks and Learning Systems, vol. 23, No. 10, pp. 1526-1538, 2012.
Thibeault, C. M., Harris, F. C., and Srinivasa, N. "Using Games to Embody Spiking Neural Networks for Neuromorphic Hardware." International Journal of Computers and their Applications, vol. 21, No. 1, pp. 40-53, 2014.
Zaliva, V., W. Melicher, S. Saha, and J. Zhang. "Passive User Idnetification Using Sequential Analysis of Proximity Information in Touchscreen Usage Patterns." In Proceedings of the 8th International Conference on Mobile Computing and Ubiquitous Networking (ICMU), 2015, pp. 161-166.
Zhu, J., P. Wu, X. Wang, and J. Zhang. "SenSec: Mobile Security through Passive Sensing." In Proceedings of the International Conference on Computing, Networking and Communication (ICNC), 2013, pp. 1128-1133.
Kayacik, H.G., Just, M., Baillie, L., Aspinall, D. and Micallef, N. "Data driven authentication: On the effectiveness of user behaviour modelling with mobile device sensors." arXiv preprint arXiv:1410.7743, 2014, pp. 1-10.
Office Action 1 for U.S. Appl. No. 15/338,228, dated Apr. 4, 2017.
Minkovich, et al., "Programming Time-Multiplexed Reconfigurable Hardward Using a Scalable Neuromorphic Compiler", IEEE Transactions on Neural Networks and Learning Systems, p. 889-901, vol. 23, No. 6, Jun. 2012.
Response to Office Action 1 for U.S. Appl. No. 15/338,228, dated Jul. 5, 2017.
Office Action 2 for U.S. Appl. No. 15/338,228, dated Nov. 28, 2017.
Response to Office Action 2 for U.S. Appl. No. 15/338,228, dated Feb. 28, 2018.
Office Action 3 for U.S. Appl. No. 15/338,228, dated Jul. 24, 2018.
Response to Office Action 3 for U.S. Appl. No. 15/338,228, dated Oct. 24, 2018.
Office Action 4 for U.S. Appl. No. 15/338,228, dated Dec. 28, 2018.
Response to Office Action 4 for U.S. Appl. No. 15/338,228, dated Mar. 26, 2019.
Compton et al., "Catastrophe Prediction via Estimated Network Autocorrelation", Proceedings of Workshop on Information in Networks, 2011.
Scheffer, et al., "Early-warning signals for critical transitions", Nature, vol. 461, Sep. 3, 2009.
Office Action 5 for U.S. Appl. No. 15/338,228, dated Jul. 11, 2019.
Response to Office Action 5 for U.S. Appl. No. 15/338,228, dated Oct. 10, 2019.
SRC Incorporated advertises as having Neuromorphic technology that performs system wide solutions with a video that suggests image classification, White Paper, https://www.srcinc.com/news-

(56) References Cited

OTHER PUBLICATIONS and-events/advanced-development/agile-condor-pod-for-air-force.html?gclid=EAIaIQobChMIncOugK-a2Q1VmLrACh37-AqIEAAYASAAEgKkm_D_BwE, Downloaded Jun. 10, 2019, pp. 1-2.

Notification of and the International Preliminary Report on Patentability Chapter I for PCT/US2019/026830; dated Oct. 1, 2020.

Claims for the International Preliminary Report on Patentability Chapter I for PCT/US2019/026830; dated Oct. 1, 2020.

* cited by examiner

NEUROMORPHIC SYSTEM FOR AUTHORIZED USER DETECTION

CROSS-REFERENCE TO RELATED APPLICATIONS

The present application is a Continuation-in-Part application of U.S. application Ser. No. 15/338,228, filed on Oct. 28, 2016, which is a Non-Provisional patent application of U.S. Provisional Application No. 62/247,557, filed in the United States on Oct. 28, 2015, the entirety of which are hereby incorporated by reference.

The present application is ALSO a Non-Provisional patent application of U.S. Provisional application No. 62/684,515, filed in the United States on Jun. 13, 2018, the entirety of which is hereby incorporated by reference.

GOVERNMENT RIGHTS

This invention was made with government support under U.S. Government Contract Number D15PC00153. The government has certain rights in the invention.

BACKGROUND OF INVENTION

(1) Field of Invention

The present invention relates to an anomaly detection system and, more particularly, to a low-power neuromorphic detection system that detects a change in classification by autonomously discovering significant differences between sensor data.

(2) Description of Related Art

Anomaly detection systems are often employed to classify sensor data or otherwise identify a change in system dynamics that can be designated as anomalous behavior. Conventional automated detection systems operate on top of conventional electronics and, as such, use a significant amount of energy to solve sophisticated classification problems. Such systems traditionally operate on large scale processors or otherwise relatively large computing systems. However, the implementation of anomaly detection in a variety of mobile and field applications requires a small-sized system that can efficiently operate on complex problems. Notably, such detection or classification systems have not been incorporated into small scale chips that can operate on complex problems with little computational overhead.

Thus, a continuing need exists for a low-power, small-sized neuromorphic anomaly detection system.

SUMMARY OF INVENTION

This disclosure is directed to a neuromorphic system for authorized user detection. The system includes a neuromorphic electronic component for embedding in or attached to a client device. The neuromorphic electronic component having a neuromorphic chip operable for continuously monitoring streaming sensor data from a client device and generating out-spikes based on the streaming sensor data.

In another aspect, the neuromorphic system further includes a client device comprising an input processing component, an output processing component, and a plurality of sensor types for providing the streaming sensor data.

In another aspect, the output processing component classifies the streaming sensor data based on the out-spikes to detect a user-transition.

In yet another aspect, the input processing component is configured to further perform operations of:
  normalizing the streaming sensor data from the plurality of sensor types as a normalized time series;
  grouping the normalized time series from the plurality of sensor types into a single scalar quantity;
  collecting a grouping of samples of the single scalar quantity into a queue;
  transforming the queue into discrete one-dimensional frequency domain data;
  modifying the one-dimensional frequency domain data with a window function to reduce spectral leakage and generate frequency domain modified data;
  filtering the frequency domain modified data to obtain scaled windowed frequency bins;
  scaling both the normalized time series and scaled windowed frequency to generate in-rates;
  mapping the in-rates to a distribution function; and
  generating in-spikes based on the mapped in-rates.

In another aspect, the neuromorphic electronics component generates the out-spikes based on the in-spikes.

In another aspect, the neuromorphic electronics component generates the out-spikes based on the in-spikes using a randomly connected excitatory-inhibitory spiking network.

In yet another aspect, the output processing component further performs operations of:
  smoothing the out-spikes into rates;
  applying the rates to a linear classifier to generate readouts;
  filtering the readouts; and
  classifying streaming sensor data as an anomalous signal based on the readouts.

Additionally, upon classification of an anomalous signal, the output processing component further performs at least one operation of:
  locking or unlocking access to the client device;
  starting a new processing task;
  executing a new logic branch of executable code;
  transmitting information associated with the anomalous signal;
  saving information associated with the anomalous signal to memory storage.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to an anomaly detection system and, more particularly, to a low power neuromorphic detection system that detects a change in classification by autonomously discovering significant differences between sensor data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided, followed by an introduction. Next, specific details of the present invention are provided to give an understanding of the specific aspects. Finally, several example implementations are provided.

(1) Principal Aspects

Figure 1:
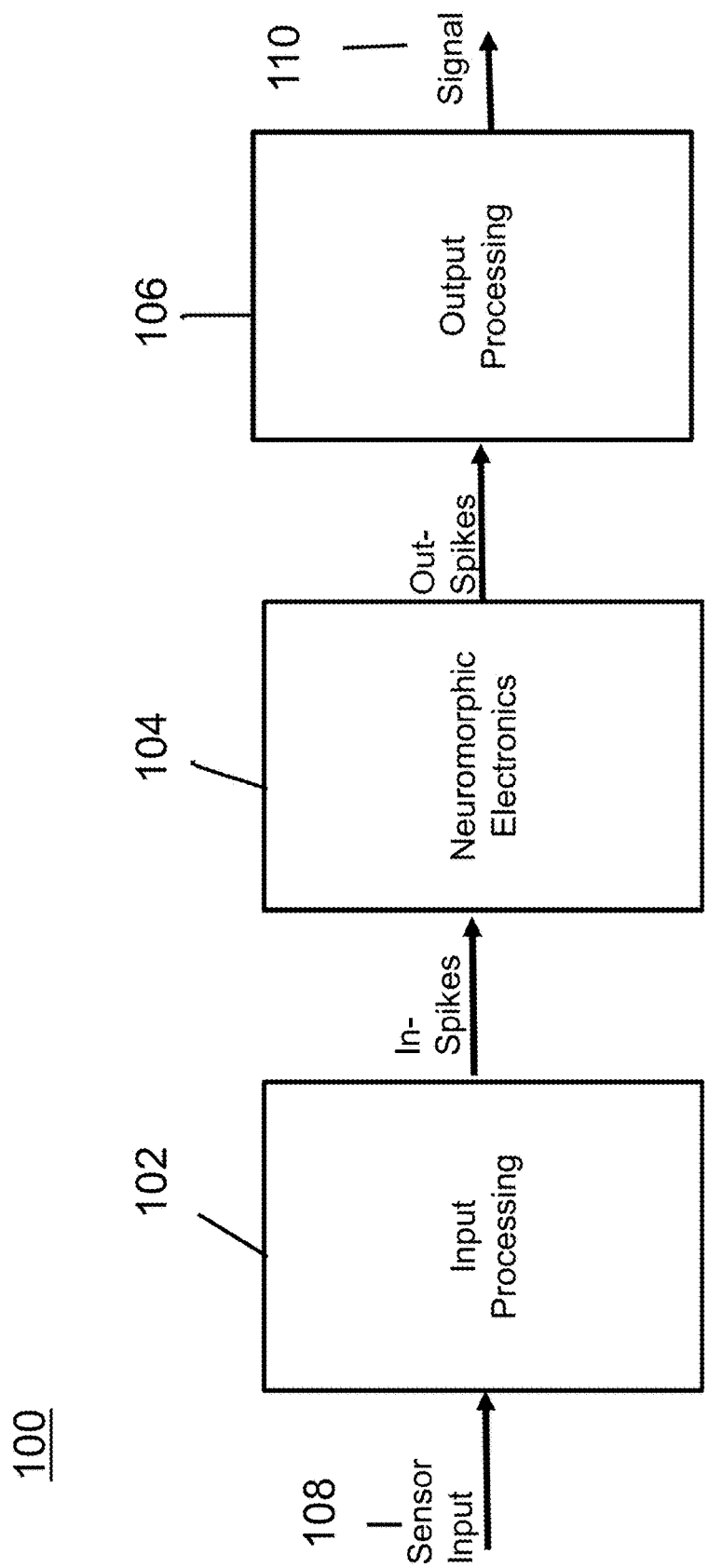
FIG. 1 is an illustration of a neuromorphic system for authorized user detection according to various embodiments of the present disclosure.

Various embodiments of the invention include three "principal" aspects. As shown in FIG. 1, the first is a low-power neuromorphic system for authorized user detection. The system has three general components, an input processing component 102, a neuromorphic electronics component 104, and an output processing component 106. Both the input processing 102 and the output processing 106 components are implemented in software and/or hardware as a computer system that is owned by or otherwise within a "client" system (such as the memory and processing components, etc., with a mobile device, vehicle, etc.). The neuromorphic electronics component 104 is the component that is implemented in neuromorphic hardware and performs the bulk of the computational processing. The second principal aspect is a method, typically in the form of software or other programming, operated using a data processing system (computer) and the neuromorphic hardware described herein. The third principal aspect is a computer program product. The computer program product generally represents computer-readable instructions stored on a non-transitory computer-readable medium such as an optical storage device, e.g., a compact disc (CD) or digital versatile disc (DVD), field programmable gate array (FPGA), or a magnetic storage device such as a floppy disk or magnetic tape. Other, non-limiting examples of computer-readable media include hard disks, read-only memory (ROM), and flash-type memories. These aspects will be described in more detail below.

Figure 2:
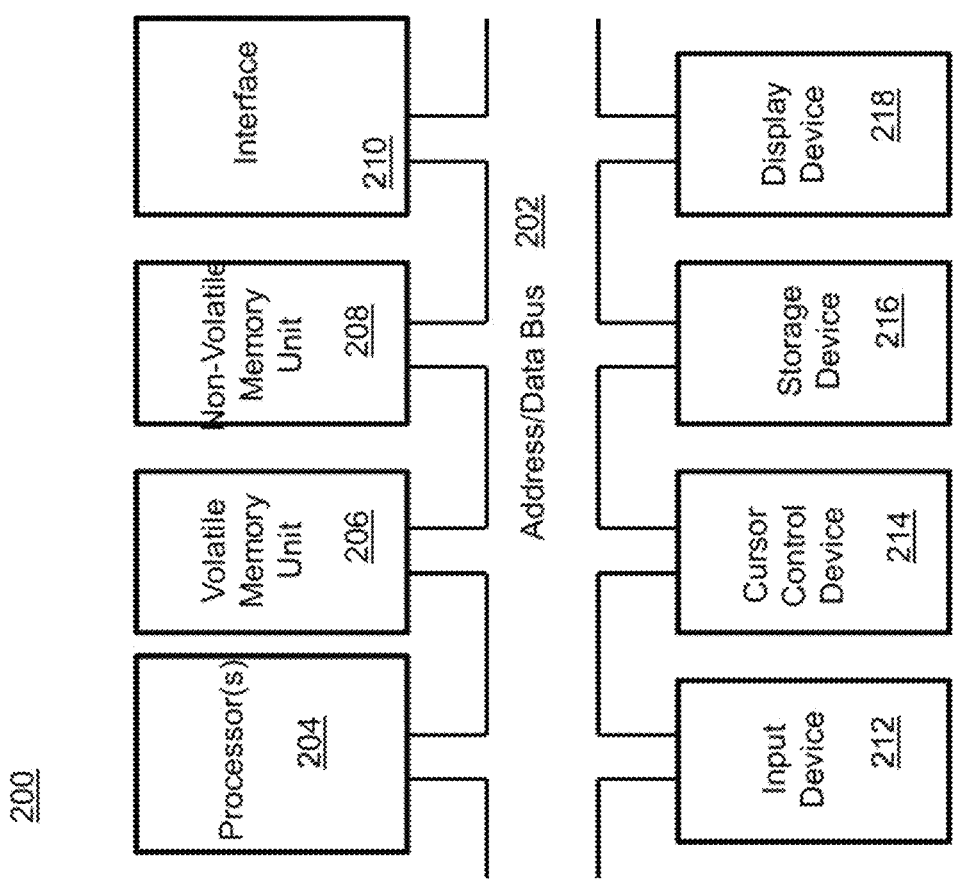
FIG. 2 is a block diagram depicting the components of input and output processing components according to some embodiments of the present disclosure.

FIG. 2 provides a block diagram depicting a non-limiting example of a computer system 200 that can be implemented to operate as the input and/or output processing components (i.e., elements 102 and/or 106 of FIG. 1). Such a computer system 200 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 200. When executed, the instructions cause the computer system 200 to perform specific actions and exhibit specific behavior as may be required to perform the processes described herein.

The computer system 200 may include an address/data bus 202 that is configured to communicate information. Additionally, one or more data processing units, such as a processor 204 (or processors), are coupled with the address/data bus 202. The processor 204 is configured to process information and instructions. In an aspect, the processor 204 is a microprocessor. Alternatively, the processor 204 may be a different type of processor such as a parallel processor, application-specific integrated circuit (ASIC), programmable logic array (PLA), complex programmable logic device (CPLD), or a field programmable gate array (FPGA).

The computer system 200 is configured to utilize one or more data storage units. The computer system 200 may include a volatile memory unit 206 (e.g., random access memory ("RAM"), static RAM, dynamic RAM, etc.) coupled with the address/data bus 202, wherein a volatile memory unit 206 is configured to store information and instructions for the processor 204. The computer system 200 further may include a non-volatile memory unit 208 (e.g., read-only memory ("ROM"), programmable ROM ("PROM"), erasable programmable ROM ("EPROM"), electrically erasable programmable ROM "EEPROM"), flash memory, etc.) coupled with the address/data bus 202, wherein the non-volatile memory unit 208 is configured to store static information and instructions for the processor 204. Alternatively, the computer system 200 may execute instructions retrieved from an online data storage unit such as in "Cloud" computing. In an aspect, the computer system 200 also may include one or more interfaces, such as an interface 210, coupled with the address/data bus 202, or other interfaces as described in further detail below (e.g., digital interface to the neuromorphic electronics). The one or more interfaces are configured to enable the computer system 200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 200 may include an input device 212 coupled with the address/data bus 202, wherein the input device 212 is configured to communicate information and command selections to the processor 200. In accordance with one aspect, the input device 212 is an alphanumeric input device, such as a keyboard, that may include alphanumeric and/or function keys. Alternatively, the input device 212 may be an input device other than an alphanumeric input device. In an aspect, the computer system 200 may include a cursor control device 214 coupled with the address/data bus 202, wherein the cursor control device 214 is configured to communicate user input information and/or command selections to the processor 200. In an aspect, the cursor control device 214 is implemented using a device such as a mouse, a track-ball, a track-pad, an optical tracking device, or a touch screen. The foregoing notwithstanding, in an aspect, the cursor control device 214 is directed and/or activated via input from the input device 212, such as in response to the use of special keys and key sequence commands associated with the input device 212. In an alternative aspect, the cursor control device 214 is configured to be directed or guided by voice commands.

In an aspect, the computer system 200 further may include one or more optional computer usable data storage devices, such as a storage device 216, coupled with the address/data bus 202. The storage device 216 is configured to store information and/or computer executable instructions. In one aspect, the storage device 216 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 218 is coupled with the address/data bus 202, wherein the display device 218 is configured to display video and/or graphics. In an aspect, the display device 218 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 200 presented herein is an example computing environment in accordance with an aspect. However, the non-limiting example of the computer system 200 is not strictly limited to being a computer system. For example, an aspect provides that the computer system 200 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 3:
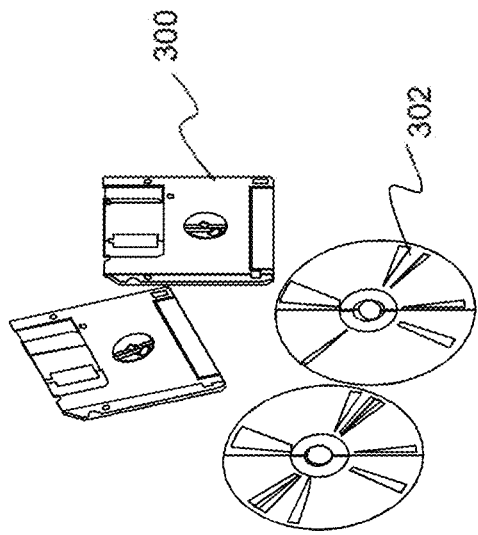
FIG. 3 is an illustration of a computer program product according to some embodiments of the present disclosure.

An illustrative diagram of a computer program product (i.e., storage device) embodying an aspect of present invention is depicted in FIG. 3. The computer program product is depicted as floppy disk 300 or an optical disk 302 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip, or in other aspects, a neuromorphic hardware chip). The "instruction" is stored on any non-transitory computer-readable medium, such as in the memory of a computer or on a floppy disk, a CD-ROM, FPGA and a flash drive.

(2) Introduction

Described is a neuromorphic system for authorized user detection. More specifically and referring again to FIG. 1, the system is a low power neuromorphic anomaly detection system 100 that identifies anomalies by detecting a change in classification by autonomously discovering significant differences between sensor data 108. Upon detection of such a change, the system then generates an output signal 110 as appropriate per the particular application. The output signal 110 can trigger any number of subsequent actions, such as computer processing tasks, transmission of information related to the anomaly or change in environment, and storage of data.

The neuromorphic electronics 104 described herein can be implemented using any suitable neuromorphic hardware. In one aspect, the neuromorphic electronics 104 component is implemented using the neuromorphic hardware as described in U.S. Pat. No. 8,977,578, the entirety of which is incorporated herein by reference. The low-power neuromorphic system of the present disclosure uses the neuromorphic hardware (such as that as described in the '578 patent) together with additional data flow steps to produce a single output signal 110. Furthermore, neuromorphic hardware is tuned/configured in a specific way as to produce desired results.

The system is unique in that it uses neuromorphic hardware (e.g., an electronic implemented non-linear liquid state machine) in combination with a software linear classifier to perform the classification of sensor data (not just images). This combination of linear and non-linear steps is unique and provides a marked improvement over the prior art. The neuromorphic technology scales in size and performs fast enough for complex problems. Further, it uses machine learning techniques to discover differences in nominal and off-nominal conditions that can be applied practically to modern "client" systems that include electronic devices. Importantly, the system applies a linear classifier to a liquid state machine with a coupling of electronics and software as sequenced in the figures submitted herewith. In doing so, the system offers a low power consumption processing of a complex problem that occurs on-board the "client" system and that enables the system to use less resources than the prior art. The implementation allows for a very low power (less than 100 Milliwatts) solution to complex classification problems with a quick response time (milliseconds to seconds depending on application) and a small size and weight footprint.

Conventional automated detection systems (without neuromorphic hardware) utilize more energy to solve sophisticated classification problems because their software operates on top of conventional electronics that are not as power efficient and are not able to parallelize the problem (thus also operating slower). Since the system of the present disclosure can perform the activities when triggering occurs, the client system does not have to perform those activities all the time. Thus, there is a large savings of resources in the areas of processor utilization, power consumption, data storage, and/or transmission bandwidth.

(3) Specific Details of Various Embodiments

As shown in FIG. 1, the neuromorphic system 100 includes three serial components: an input processing component 102 (that receives sensor input 108), a neuromorphic electronics 104 component, and an output processing component 106 (that generates the output signal 110). The sensor input 108 includes various types of sensor data. Non-limiting examples of sources of the sensor input 106 data include gyroscopes, accelerometers, altimeters, fuel levels, computer network traffic, etc., that feed the input processing component 102.

As noted above, both the input processing 102 and the output processing 106 components are implemented in software and run on a conventional computer processor and can be incorporated into any platform or client device that can receive streaming data. Examples of such client devices include a mobile device (e.g., phone, iPad, etc.), an autonomous vehicle, computer, or any other platform/client device that uses a processor and receives streaming data. Thus, while the specific client device is described below and illustrated as a mobile device, such as a phone, it should be understood that the invention is not intended to be limited thereto as all of the features as described and illustrated can be incorporated into a variety of different applications.

The neuromorphic electronics 104 component is the component that is implemented in neuromorphic hardware and performs the bulk of the computational processing. The neuromorphic electronics 104 communicates with the other processing components 102 and 106 through a digital interface (e.g., a Serial Peripheral Interface (SPI)). The output processing 106 generates a binary output signal 110 which represents either a nominal status (e.g., authorized user) or an anomaly detected status (e.g., unauthorized user).

Figure 4:
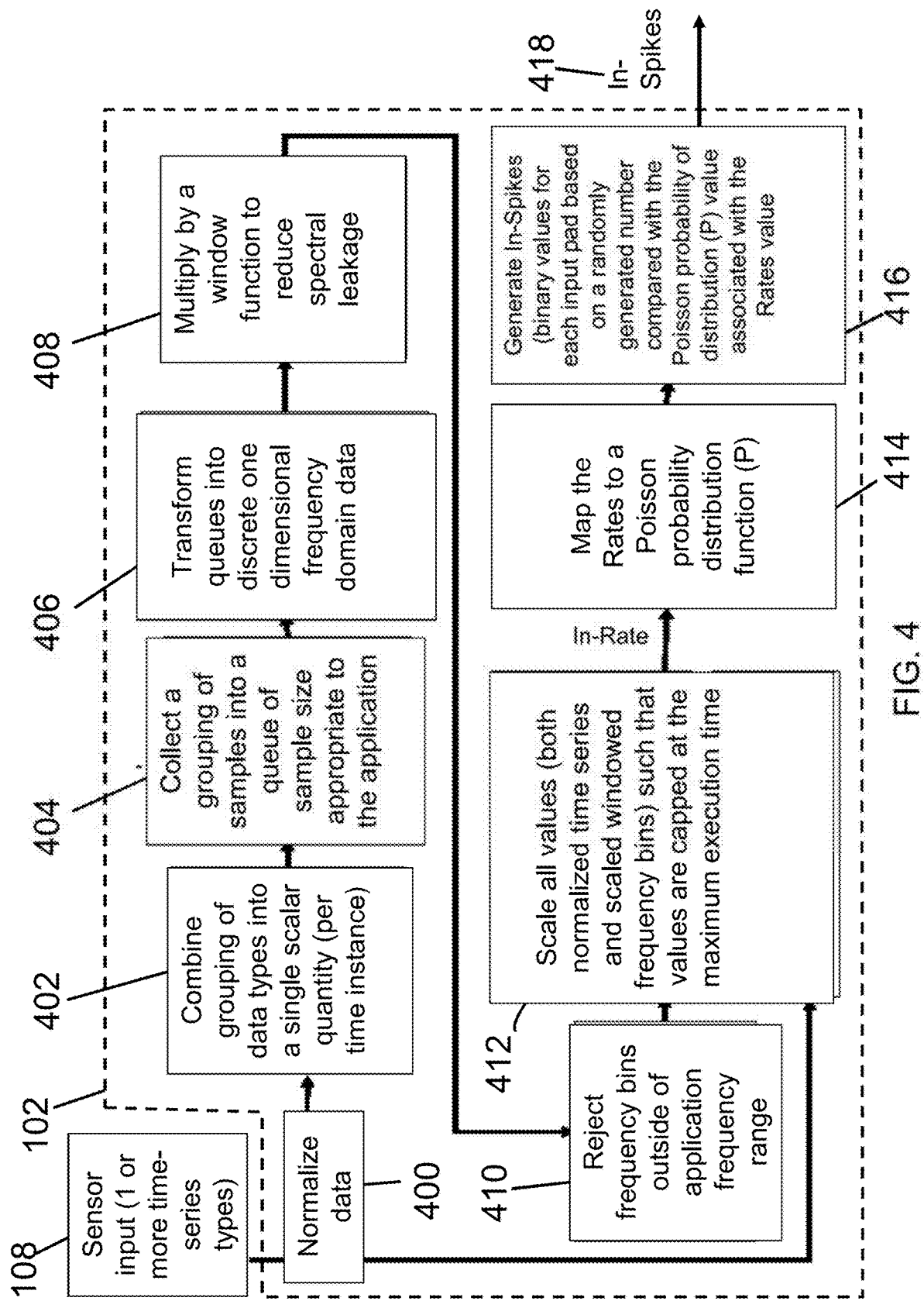
FIG. 4 provides a flowchart depicting processing flow within the input processing component according to some embodiments of the present disclosure.

For further understanding, FIG. 4 provides a flowchart depicting processing flow within the input processing 102 component. The input processing 102 component cleans (i.e., normalizes data 400) the sensor input 108 (i.e., streaming sensor data) and then maps the data into either the frequency domain (fd) or the time domain (td). All of the data (both td and fd) is then converted into rates and then into in-spikes 418, as described in further detail below.

The sensor input 108 data is normalized 400 by mapping sensor-specific ranges onto a zero to one scale to generate a normalized time series of data. In the frequency domain, the data is combined 402 by grouping data types into a single scalar quantity per time instance. Thereafter, a grouping of samples are collected 404 into a queue of sample size appropriate to the application. The queues are transformed 406 into discrete one-dimensional (1D) frequency domain data. The 1D frequency domain data is then modified 408 by multiplying the data by a window function (such as a Hamming window or any other suitable window function) to reduce spectral leakage. Thereafter, the data is filtered 410 by rejecting frequency bins outside of a particular application frequency range, resulting in scaled windowed frequency bins. A non-limiting example of such an application and frequency range includes selecting frequencies between 0.5 and 10 Hz in a gait application.

The input processing 102 component then scales 412 all values (both the normalized time series and scaled windowed frequency bins) such that values are capped at the maximum execution time to generate in-rates. For example, the values are linearly mapped onto the range of spiking rates (e.g., 0-200 Hz, etc.) The in-rates are mapped 414 to a distribution function (e.g., Poisson probability distribution function (P)). Finally, in-spikes 418 are generated 416 for each input pads of the neuromorphic electronics component 104 and its neuromorphic chip 821. The in-spikes 418 are binary values for each input pad that are generated based on a randomly generated number compared with the Poisson probability distribution (P) value associated with the in-rates value. The in-spikes 418 are transmitted in a structure equivalent to a 1-dimensional binary array. The maximum number of in-spikes 418 is equal to the number of input pads that reside on the neuromorphic chip (i.e., neuromorphic electronics component with an electronically implemented Liquid State Machine with leaky integrate and fire neurons, such as that disclosed in U.S. Pat. No. 8,977,578).

Figure 5:
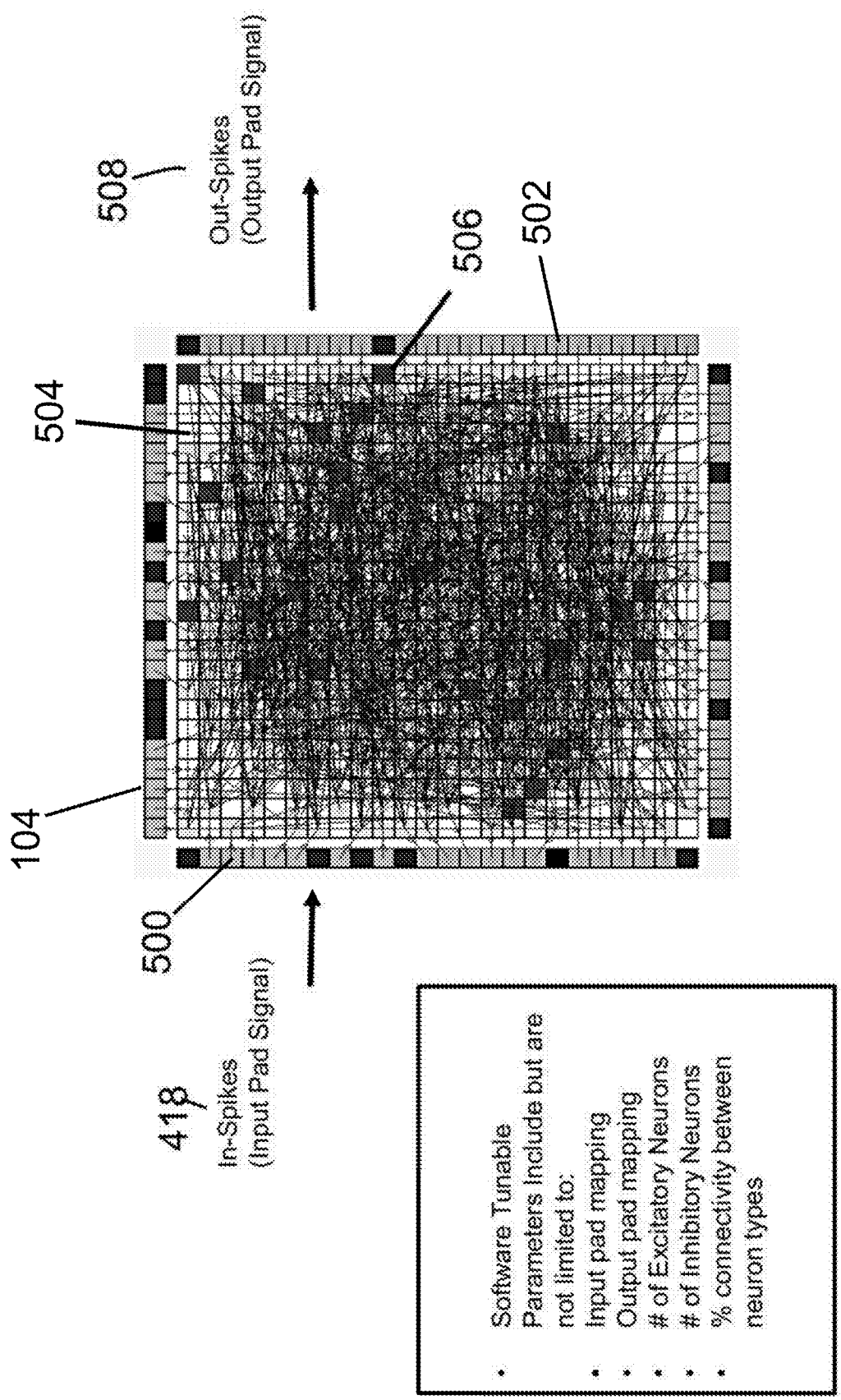
FIG. 5 is a graphical representation of paths that an electronic signal may travel through a neuromorphic electronics component according to some embodiments of the present disclosure.

FIG. 5 provides a graphical representation of a neuromorphic electronics 104 component and the paths that an electronic signal may travel from input pads 500 to output pads 502 for a particular configuration. Light squares 504 represent excitatory neurons and dark squares 506 represent inhibitory neurons. The neuromorphic electronics 104 component receives as an input the in-spikes 418 and generates out-spikes 508 as the output pad signal. The out-spikes 508 are also transmitted in a structure equivalent to a 1-dimensional binary array. The maximum number of out-spikes 508 is equal to the number of output pads 502 that reside on the neuromorphic chip of the neuromorphic electronics 104.

Figure 6:
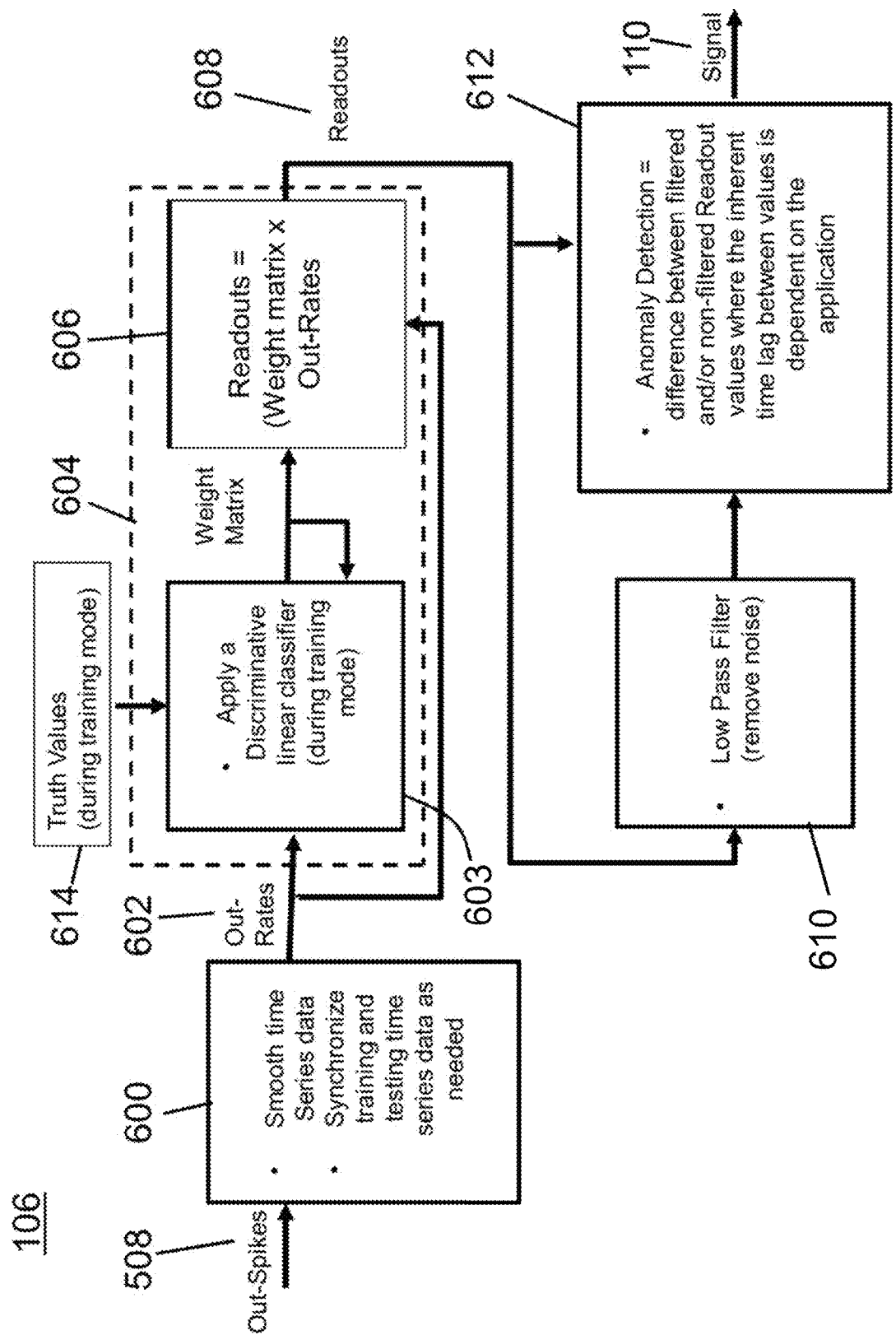
FIG. 6 illustrates a process flow for the output processing component according to some embodiments of the present disclosure.

FIG. 6 illustrates a process flow for the output processing 106 component. As shown in FIG. 6, the out-spikes 508 are smoothed 600 into firing rates or out-rates 602, which are a measure of the number of spikes per second. The rates 602 are then applied to the linear classifier 604 to compute 606 the readouts 608. The linear classifier 604 acts as a mapping from rates 602 to readouts 608. Linear classifiers are commonly understood by those skilled in the art (see, for example, "Linear classifier" as defined by Wikipedia®, the entirety of which is incorporated herein by reference). It is referred to as a linear classifier 604 because each readout 608 is a linear combination of rates 602. Thus, it is a simple matrix multiplication operation, where the learning process is what determines the matrix by which the rates 602 are multiplied to get the readouts 608. Desirably, discriminative training 603 must occur on the linear classifier 604 before a reliable anomaly signal generation can occur. Training 603 is based on supervised machine learning techniques using ground truth values 614. Each training session is dedicated to one class at a time (there may be 2 or more classes). The differences between the classes (time domain and/or frequency domain) is what will cause the anomaly or anomalous signal. The frequency domain data is calculated in real-time and used in a sliding window manner. The amount of frequency domain output data size is equal to the queue sample size.

Readouts 608 are a number of float values that correspond to each Class (2 or more). Readouts are then filtered 610 to remove noise and perform an anomaly detection process 612, which results in the final output signal 110 (e.g., the anomalous signal which specifies that there was an authorized or unauthorized user). The anomaly detection process 612 identifies an unauthorized user or authorized user by signaling that a change in users has occurred. The readout 608 signals become anomalous when there is a user-transition, and that anomaly (in the readout 608 signal) is what is detected by the system.

(4) Example Implementations

As can be appreciated by those skilled in the art, the neuromorphic anomaly detection system of the present disclosure has many applications. For example, the system has been applied to detecting a change in users of a mobile device using biometric sensor data. In that implementation, the system was physically attached or embedded into the mobile device where power usage of the mobile device was the focus of resource savings. When an unauthorized user is detected, the mobile device can lock out the user from further using the device until an authorized user is detected (at which point the features/functions of the mobile device are unlocked and accessible). Additionally, the system can be used in other applications where power consumption, feature size and or accessibility to the device is very limited. The system is also beneficial where a complicated anomaly detection would be most beneficial if performed directly on the Client System (as appose to off-board server/cloud solutions).

Figure 7:
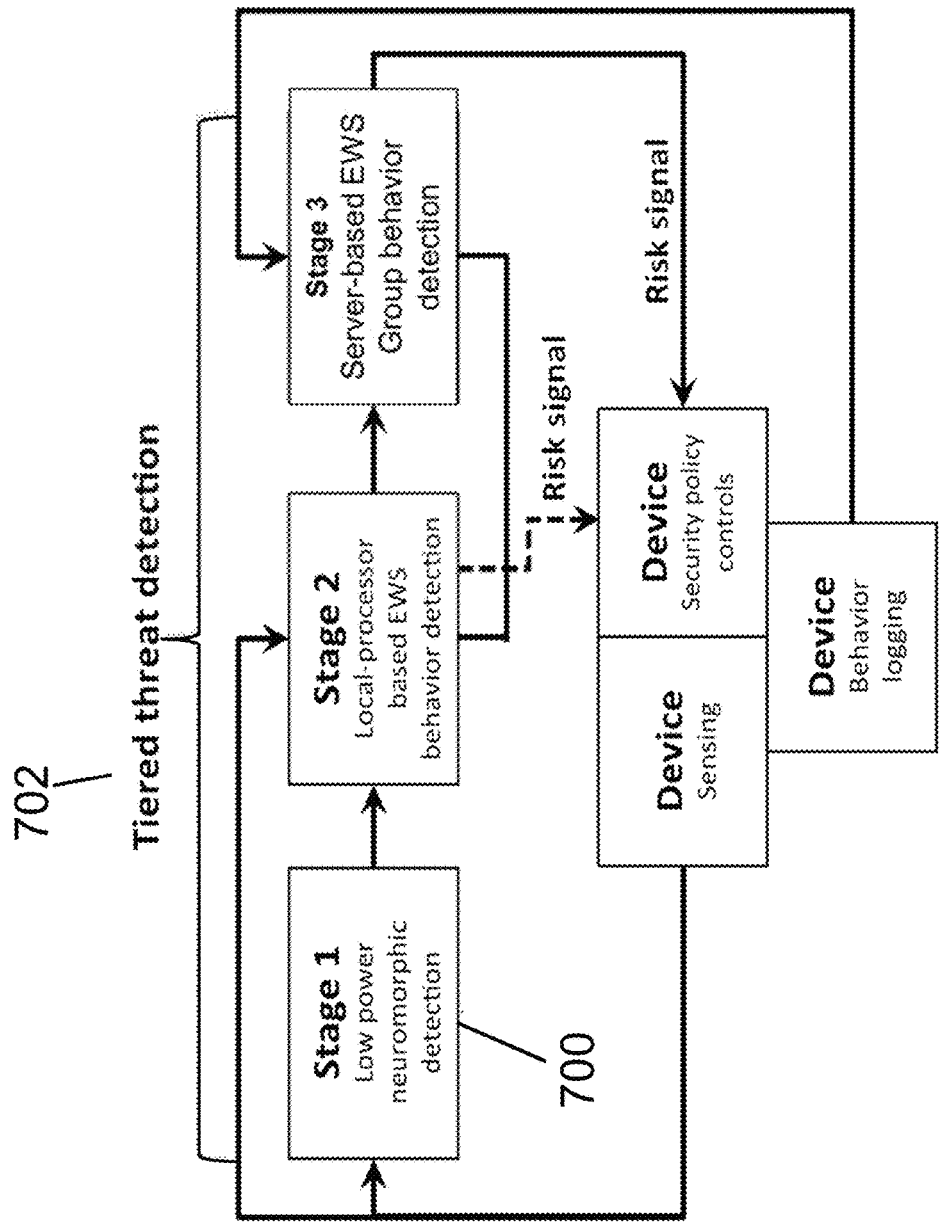
FIG. 7 is a flowchart illustrating an example of a tiered threat detection system in which the neuromorphic system of the present disclosure was implemented.

As a specific example, the low-power neuromorphic system of the present disclosure was applied in a tiered anomaly classification solution, such as in Stage 1 box 700 of the tiered threat detection algorithm 702 (shown in FIG. 7) further described in U.S. application Ser. No. 15/338,228. In other words, the process as described in U.S. application Ser. No. 15/338,228 was modified to include the low-power neuromorphic system of the present disclosure as the Stage 1 box 700. In that modified system, the sensor data was generated from gyroscopes and accelerometers at 50 Hz. The queue size was 200 samples. The application frequency range of interest was from 0.3 Hz to 20.0 Hz. Rates were capped at 200 Hz. Execution times ranged from 1.5 ms to 5 ms. About 25 input pads were actively used and about 50 output pads were actively used. The liquid state machine (LSM) was configured such that 300 excitatory neurons and 25 inhibitory neurons were activated. The network graph of neurons was connected at 1%. The system did successfully distinguish between multiple users operating the phone and a phone alarm sounded when a non-authenticated user walked with phone.

Figure 8:
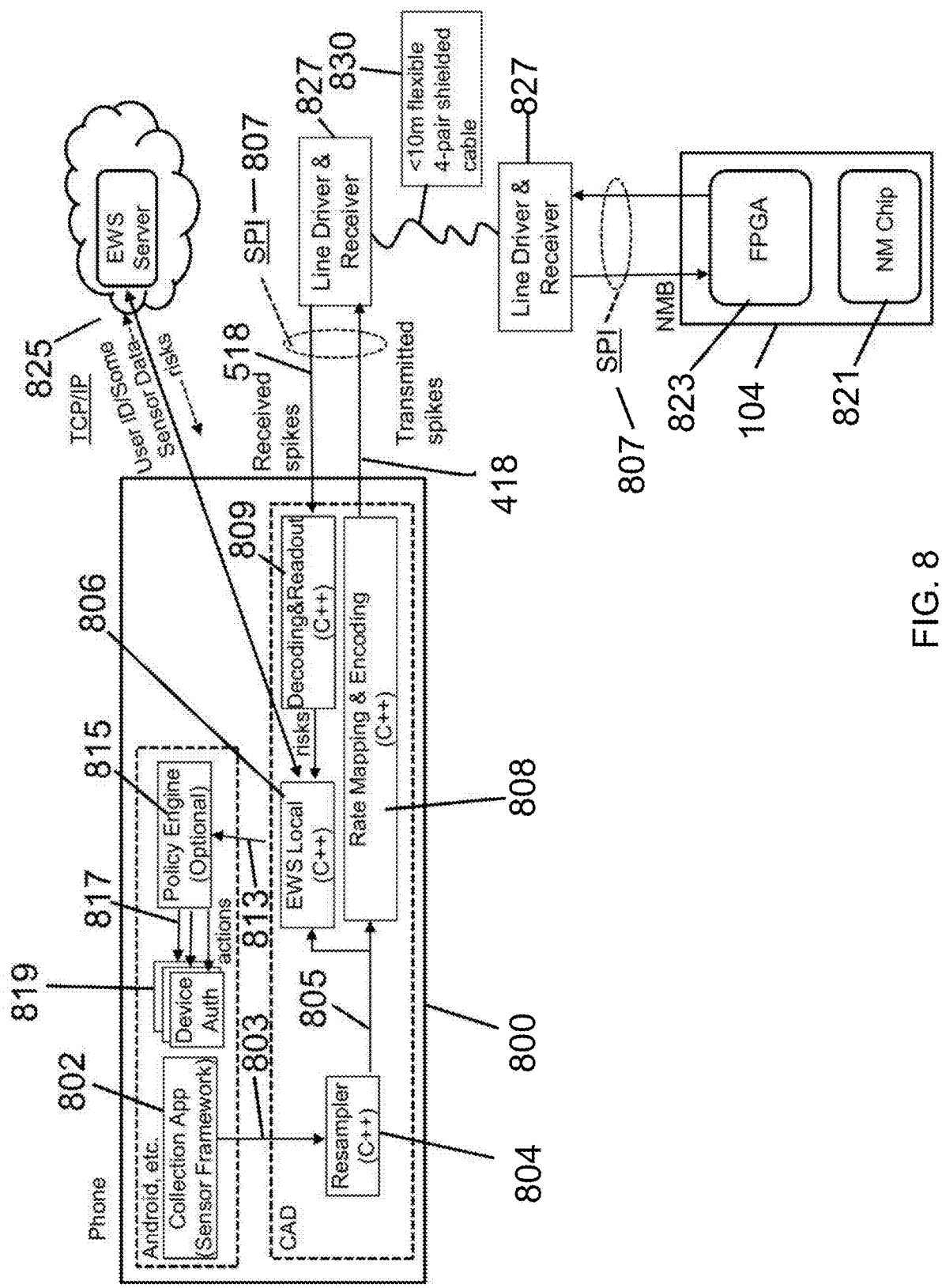
FIG. 8 shows a schematic of an example mobile device and neuromorphic electronics in which the neuromorphic detection system of the present disclosure was implemented.

FIG. 8 shows a schematic of an example mobile device 800 (e.g., phone) and neuromorphic electronics 104 (i.e., neuromorphic chip 821 communicating with an FPGA 823 or any other hardware or component as may be necessary to allow the neuromorphic chip 821 to operate) component. The FPGA 823 is responsible for neuromorphic chip 821 configuration (e.g., a non-limiting example of which includes loading a particular network, such as the one described above with respect to FIG. 5). Subcomponents that have been developed and that reside on the mobile device 800 include the sensor data collection app 802 and data re-sampler 804 which converts all sensor streams from a non-uniform sensor data 803 to a uniform sampling rate (i.e., uniform data (binary) 805). The output of the re-sampler 804 goes directly to the local EWS app 806 and to the rate-based spike encoder 808 (which operate as the input processing component described above). It should be noted that a shielded cable 830 is illustrated for transmission; however, the invention is not limited to such a cable as the specific cable 830 as illustrated is provided as a non-limiting example of such a transmission medium.

The sensor signals, encoded as in-spikes 418, are sent to the neuromorphic electronics 104 component via the serial peripheral interface (SPI) connection 807 on the mobile device 800 and the corresponding line drivers and receivers 827. The alerts generated by the neuromorphic electronics 104 are encoded as out-spikes 518 and sent over the SPI connection 807 (and corresponding line drivers and receivers 827) to the mobile device 800, where they are decoded 809 and then read by the EWS app 806 (i.e., which operates as the output processing component described above) to determine the intent or classification, which is then broadcast 813 to an optional policy engine 815 that maintains policies as to what is acceptable intent.

As a non-limiting example, if the policy engine 815 specifies that a classification of "unauthorized user" can not be allowed to continue using the device 800, then a variety of protocols or actions 817 can be sent for implementation by the mobile device 800, such as an operation of locking all device access 819 until an authorized user is detected (e.g., an appropriate access code is input into the system by the authorized user). Other examples based on anomaly detection (i.e., unauthorized user access, etc.) include starting a new processing task or executes a new logic branch of executable code, transmitting information associated with the anomaly, and saving information associated with the anomaly to memory storage. In some aspects, the above activities are terminated once or shortly after the signal transitions from an anomaly back to a nominal state. Or, as yet another example, if the signal is classified as a authorized user, then the device 800 of other features in the device can be unlocked. As an optional step, activity between devices can be correlated by an EWS 825.

Figure 9:
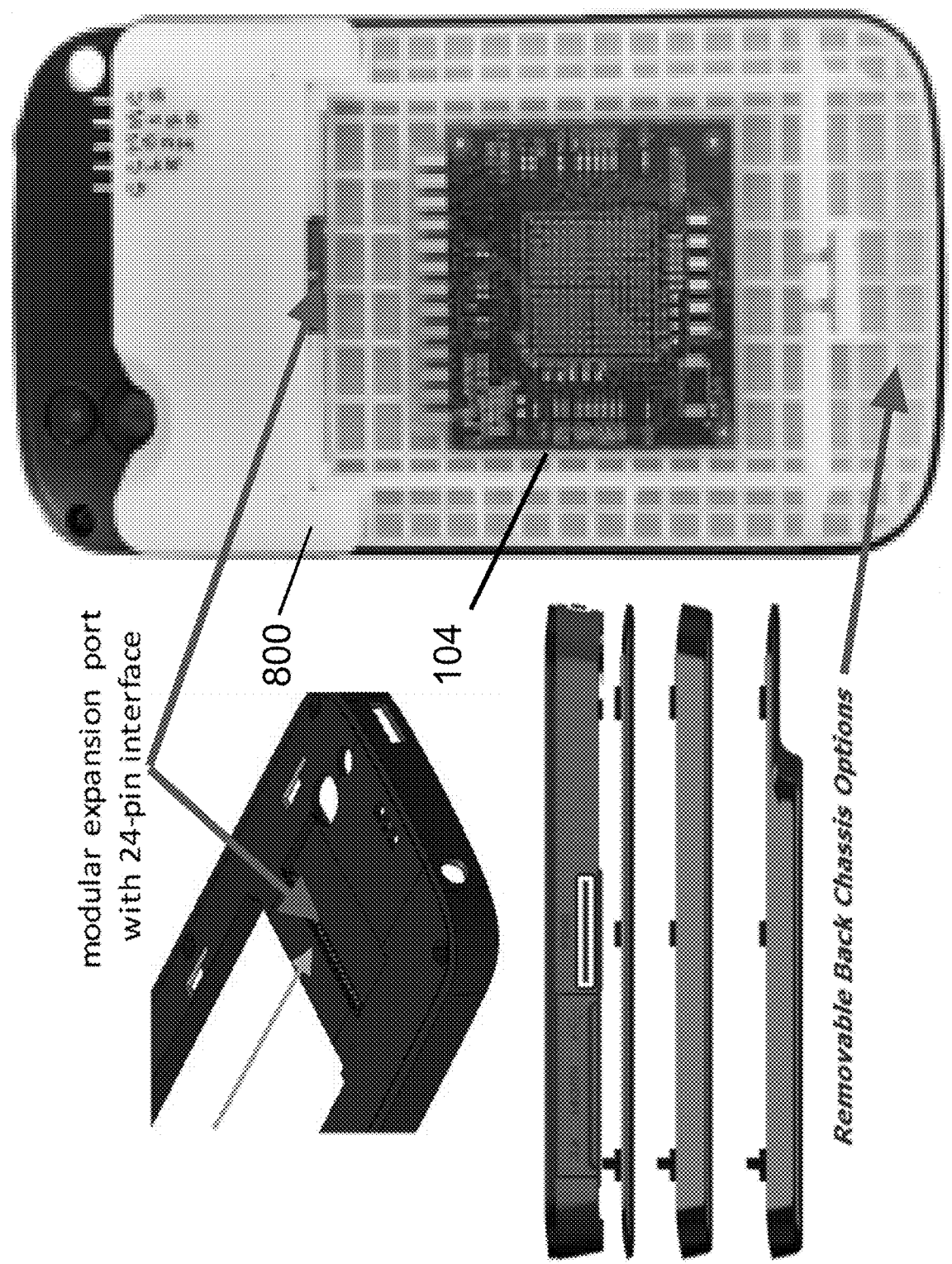
FIG. 9 is an illustration of an example mobile device in which the neuromorphic detection system of the present disclosure was implemented.
Figure 10:
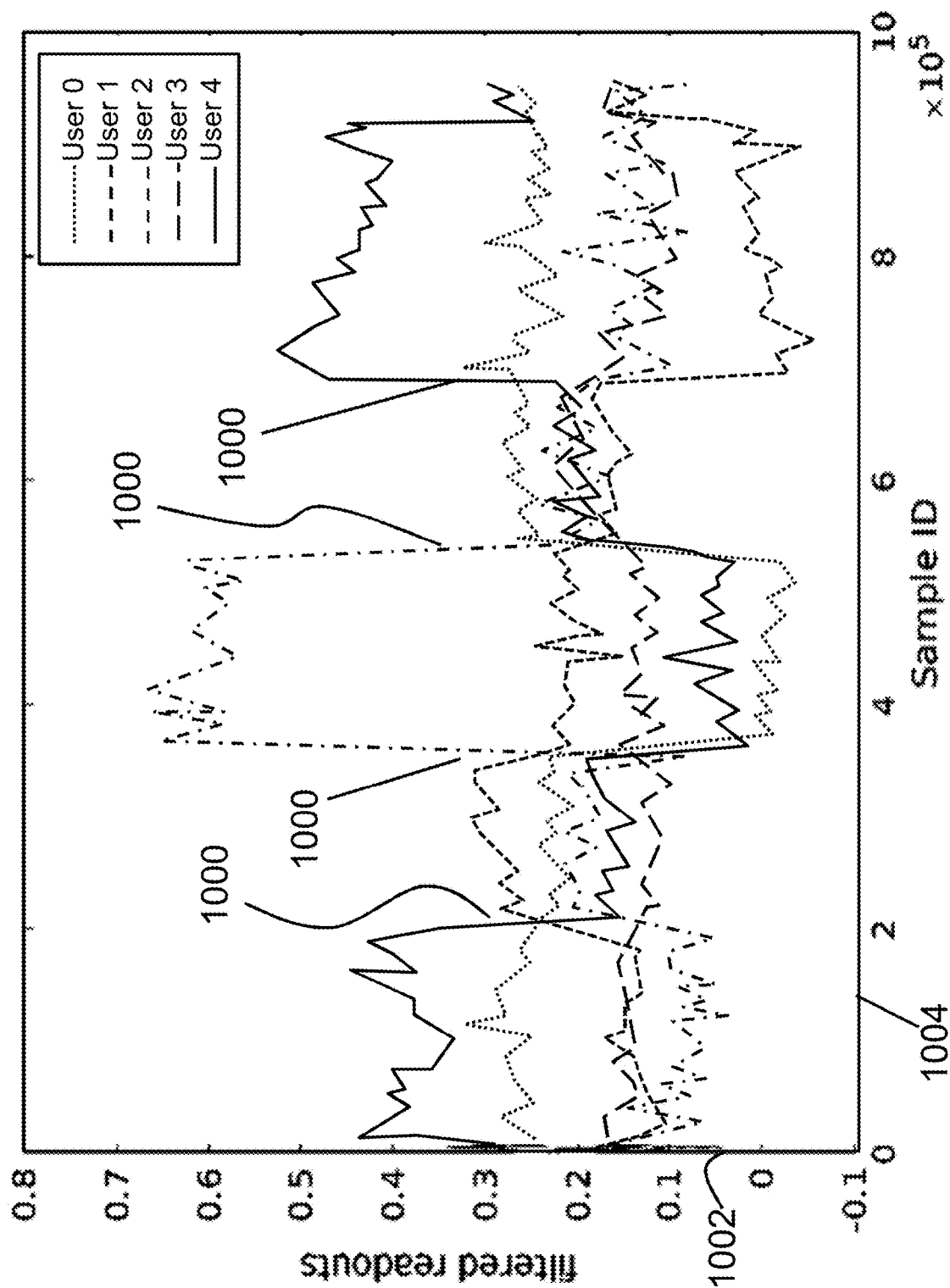
FIG. 10 is a graph illustrating a 5-user exponentially smoothed readout signal from the neuromorphic platform, depicting detected user-transitions.

FIG. 9 illustrates an example mobile device 800 in which the neuromorphic detection system of the present disclosure was implemented, along with the included neuromorphic electronics 104 component on the interface backplate attached to the mobile device 800. The signal output from the device 800 via the SPI connection was tested. As shown in FIG. 10, the 5-user exponentially smoothed readout signal from the neuromorphic platform was input to the neuromorphic classifier and performed with an average 84.16% accuracy. In FIG. 10, the "filtered readouts" axis 1002 is a dimensionless number. They are the result of multiplying the out-rates with the linear classifier weight matrix and then applying a low-pass filter. The "Sample ID" axis 1004 refers to a data point index and so is also dimensionless. It should be understood that the x-axis can also be generated based on time since index and time are isomorphic in this context.

The lowest per-user classification accuracy was 66.53%, and the highest reached 99.21%. The average true positive and negative rates were 89.67% and 60.32% respectively. As the chip was trained on 5 different subjects' data, the chance classification rate is 20%. These results show respectable user classification for a low-power consuming system. Spiking transitions across the time domain denote user-transitions 1000, which are measured through readout signals. As noted above, the readout signals become anomalous when there is a user-transition 1000, and that anomaly (in the readout signal) is what is detected by the system.

In some embodiments, perhaps more important than user classification is the ability of the neuromorphic system to detect changes in user identity. In order to create meaningful performance estimates, a consecutive alarm aggregation policy was enacted on the user-transition output and the time-series was divided into equal-length blocks from which ground-truth was determined. First, a user transition policy set a minimum margin of 8.2 seconds between detection of false alarms. Doing so prevents unwanted consecutive alarms from occurring for the same transition event. Second, the total number of trials tested for each alarm was set to: (total time in sample set)/(2*margin). If an alarm was not detected within +/− margin seconds of the truth time associated with an alarm, then the alarm was classified as a false-negative. If it was detected, it is counted as a true-positive. Using this experimental setup, the resulting metrics produced 98.74% accuracy in detecting user transitions, with a true positive rate of 99.57% and a true negative rate of 75%. These results show a substantial advantage to using the neuromorphic system as a user-transition detection system because of its high accuracy, which minimizes the amount of times the local EWS would run, thus further conserving power.

Continuous behavior-based authentication of devices (e.g., mobile devices) is a significant core technology area. The development of improved low power security and authentication technologies for mobile devices is of great interest both in the defense and commercial sectors where personal data theft from lost or stolen mobile devices (e.g., phones) is a growing problem. Mobile devices are increasingly being embedded in vehicles and aircraft, and secure authentication of these devices is becoming more and more critical given the intent for adversaries to co-opt these systems. The security imperative to continually and reliably authenticate users with minimal burden requires power efficient behavior-based inference. The invention described herein offers transformative capabilities for the development of next generation behavior-based authentication and enhanced security protocols for a variety of devices, including mobile devices. Upon detection of an unauthorized user, the devices can be caused to perform a variety of automated actions, including ceasing operations, pulling an autonomous vehicle safely to the side of a road and turning off, locking out a user, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A neuromorphic system for authorized user detection, comprising:
    a neuromorphic electronic component for embedding in or attached to a client device, the neuromorphic electronic component having a neuromorphic chip operable for continuously monitoring streaming sensor data from a client device and generating out-spikes based on the streaming sensor data;
    a client device comprising a plurality of sensor types for providing the streaming sensor data, an input processing component, and an output processing component, and wherein the output processing component classifies the streaming sensor data based on the out-spikes to detect a user-transition; and
    wherein the input processing component is configured to further perform operations of:
        normalizing the streaming sensor data from the plurality of sensor types as a normalized time series;
        grouping the normalized time series from the plurality of sensor types into a single scalar quantity;
        collecting a grouping of samples of the single scalar quantity into a queue;
        transforming the queue into discrete one-dimensional frequency domain data;
        modifying the one-dimensional frequency domain data with a window function to reduce spectral leakage and generate frequency domain modified data;
        filtering the frequency domain modified data to obtain scaled windowed frequency bins;
        scaling both the normalized time series and scaled windowed frequency to generate in-rates;
        mapping the in-rates to a distribution function; and
        generating in-spikes based on the mapped in-rates.

2. The neuromorphic system as set forth in claim 1, wherein the neuromorphic electronics component generates the out-spikes based on the in-spikes.

3. The neuromorphic system as set forth in claim 2, wherein the neuromorphic electronics component generates the out-spikes based on the in-spikes using a randomly connected excitatory-inhibitory spiking network.

4. A neuromorphic system for authorized user detection, comprising:
    a neuromorphic electronic component for embedding in or attached to a client device, the neuromorphic electronic component having a neuromorphic chip operable for continuously monitoring streaming sensor data from a client device and generating out-spikes based on the streaming sensor data;
    a client device comprising a plurality of sensor types for providing the streaming sensor data, an input processing component, and an output processing component, and wherein the output processing component classifies the streaming sensor data based on the out-spikes to detect a user-transition; and wherein the output processing component further performs operations of:
  smoothing the out-spikes into rates;
  applying the rates to a linear classifier to generate readouts;
  filtering the readouts; and
  classifying streaming sensor data as an anomalous signal based on the readouts.

5. The neuromorphic system as set forth in claim 1, wherein upon classification of an anomalous signal, the output processing component further performs at least one operation of:
  locking or unlocking access to the client device;
  starting a new processing task;
  executing a new logic branch of executable code;
  transmitting information associated with the anomalous signal;
  saving information associated with the anomalous signal to memory storage.

6. A neuromorphic method for authorized user detection, comprising acts of:
  continuously monitoring streaming sensor data from a client device using a neuromorphic electronic component with a neuromorphic chip; and
  generating out-spikes based on the streaming sensor data with the neuromorphic electronic component with the neuromorphic chip;
  classifying the streaming sensor data based on the out-spikes to detect a user-transition using the client device, the client device having a plurality of sensor types for providing the streaming sensor data, an input processing component, and an output processing component, wherein the output processing component classifies the streaming sensor data; and
  further performing, by the input processing component, acts of:
    normalizing the streaming sensor data from the plurality of sensor types as a normalized time series;
    grouping the normalized time series from the plurality of sensor types into a single scalar quantity;
    collecting a grouping of samples of the single scalar quantity into a queue;
    transforming the queue into discrete one-dimensional frequency domain data;
    modifying the one-dimensional frequency domain data with a window function to reduce spectral leakage and generate frequency domain modified data;
    filtering the frequency domain modified data to obtain scaled windowed frequency bins;
    scaling both the normalized time series and scaled windowed frequency to generate in-rates;
    mapping the in-rates to a distribution function; and
    generating in-spikes based on the mapped in-rates.

7. The neuromorphic method as set forth in claim 6, further comprising an act of generating, by the neuromorphic electronics component, the out-spikes based on the in-spikes.

8. The neuromorphic method as set forth in claim 7, wherein the neuromorphic electronics component generates the out-spikes based on the in-spikes using a randomly connected excitatory-inhibitory spiking network.

9. The neuromorphic method as set forth in claim 6, further performing, by the output processing component, acts of:
  smoothing the out-spikes into rates;
  applying the rates to a linear classifier to generate readouts;
  filtering the readouts; and
  classifying streaming sensor data as an anomalous signal based on the readouts.

10. The neuromorphic method as set forth in claim 6, wherein upon classification of an anomalous signal, further performing at least one act of:
  locking access to the client device;
  starting a new processing task;
  executing a new logic branch of executable code;
  transmitting information associated with the anomalous signal; and
  saving information associated with the anomalous signal to memory storage.

11. A computer program product for authorized user detection, the computer program product comprising:
  a non-transitory computer-readable medium having executable instructions encoded thereon, such that upon execution of the instructions by one or more processors, the one or more processors perform operations of:
    receiving out-spikes from a neuromorphic electronic component with a neuromorphic chip, the neuromorphic electronic component continuously monitoring streaming sensor data from a client device and generating out-spikes based on the streaming sensor data;
    classifying, using the client device, the streaming sensor data based on the out-spikes to detect a user-transition, the client device having a plurality of sensor types for providing the streaming sensor data, an input processing component, and an output processing component, wherein the output processing component classifies the streaming sensor data;
  further comprising instructions for causing the input processing component to perform operations of:
    normalizing the streaming sensor data from the plurality of sensor types as a normalized time series;
    grouping the normalized time series from the plurality of sensor types into a single scalar quantity;
    collecting a grouping of samples of the single scalar quantity into a queue;
    transforming the queue into discrete one-dimensional frequency domain data;
    modifying the one-dimensional frequency domain data with a window function to reduce spectral leakage and generate frequency domain modified data;
    filtering the frequency domain modified data to obtain scaled windowed frequency bins;
    scaling both the normalized time series and scaled windowed frequency to generate in-rates;
    mapping the in-rates to a distribution function; and
    generating in-spikes based on the mapped in-rates.

12. The computer program product as set forth in claim 11, further comprising instructions for causing the output processing component to perform operations of:
  smoothing the out-spikes into rates;
  applying the rates to a linear classifier to generate readouts;
  filtering the readouts; and
  classifying streaming sensor data as an anomalous signal based on the readouts.

13. The computer program product as set forth in claim 12, wherein upon classification of an anomalous signal, further causing the one or more processors to perform at least one operation of:
  locking access to the client device;
  starting a new processing task;

executing a new logic branch of executable code;
transmitting information associated with the anomalous signal; and
saving information associated with the anomalous signal to memory storage.

\* \* \* \* \*